United States Patent
Murakami

(10) Patent No.: US 6,877,867 B1
(45) Date of Patent: Apr. 12, 2005

(54) DOOR MIRROR

(75) Inventor: Shinichi Murakami, Miyazaki (JP)

(73) Assignee: Honda Lock Mfg. Co., Ltd., Miyazaki (JP)

( * ) Notice: Subject to any disclaimer, the term of this patent is extended or adjusted under 35 U.S.C. 154(b) by 0 days.

(21) Appl. No.: 10/377,118

(22) Filed: Mar. 3, 2003

(30) Foreign Application Priority Data

Mar. 14, 2002 (JP) ......................................... 2002-070177

(51) Int. Cl.$^7$ .............................................. G02B 5/08
(52) U.S. Cl. ...................................................... 359/841
(58) Field of Search .............................. 359/841, 844, 359/871, 872, 874, 875, 876; 248/480, 483, 484, 487

(56) References Cited

U.S. PATENT DOCUMENTS

| 4,809,561 A | * | 3/1989 | Tsuyama ................... 74/502.1 |
| 5,177,642 A | * | 1/1993 | Wakimoto ................... 359/844 |
| 5,182,676 A | * | 1/1993 | Iwai et al. .................. 359/841 |
| 6,322,221 B1 | * | 11/2001 | van de Loo ................ 359/841 |

* cited by examiner

Primary Examiner—Euncha P. Cherry
(74) Attorney, Agent, or Firm—Liniak, Berenato & White

(57) ABSTRACT

A door mirror including mirror-supporting therewith bracket supported by a bearing portion disposed integrally to a base of a support shaft, and a coil spring located under compression between a resilient receptacle and the bearing portion for urging the bearing portion toward the support seat. One bearing portion supported to the base end of the support and another bearing portion spaced apart from the bearing portion and supported rotationally on the top end of the support shaft are provided integrally to the bracket. The resilient receptacle is secured to a predetermined position of the support shaft so as to sandwich the coil spring that is compressed to a set load after passage of the support shaft through the coil spring located between both of the bearing portions between one of the bearing portions situated on the side of the support seat and the receptacle.

6 Claims, 6 Drawing Sheets

DOOR MIRROR

BACKGROUND OF THE INVENTION

1. Field of the Invention

The present invention concerns a door mirror for use in a vehicle including a base attached to a side door of the vehicle and having a support seat facing upward and a support shaft vertically disposed to the support seat, a bearing portion disposed integrally to a bracket for supporting a mirror and supported to the base of the support shaft while enabling the bracket to rotate in the forward and backward directions of the vehicle, and a coil spring located under compression between a resilient receptacle secured to the support shaft and the bearing portion for urging the bearing portion toward the support seat.

2. Statement of the Related Art

The door mirror of the structure described above has already been known, for example, in Japanese Utility Model Laid-Open No. 93231/1992 and Japanese Patent No. 3179337.

By the way, between the support seat of the base and the bearing portion provided integrally to the bracket facing the support seat, a click mechanism is present for providing a clear feeling of clicking motion upon rotation of the bracket around the axis of the support shaft, and a coil spring is mounted under compression between the resilient receptacle secured to the support shaft and the bearing portion facing the support seat, for attaining the clicking motion by the click mechanism and for inhibiting the bracket from detaching out of the support shaft.

For facilitating the operation of mounting the coil spring to the support shaft and the operation of securing the resilient receptacle to the support shaft while compressing the coil spring as it is, only one bearing portion facing the support seat is provided integrally to the bracket. However, such a cantilever structure by the single bearing portion may cause fine vibrations to the mirror supported by the bracket caused from the vibrations of a vehicle during running to possibly hinder the view at the mirror. Then, in the existent mirror described above, a separate support member is attached to the bracket and the support member and the bearing are supported by the support shaft in a double-side support structure. However, this requires an additional support member separately from the bracket, to increase the number of parts and also require an operation of attaching the support member to the bracket to increase the number of assembling steps.

The present invention has been accomplished in view of the foregoings and it intends to provide a door mirror for use in a vehicle capable of supporting a bracket by a support shaft in a double-side support structure thereby suppressing vibrations of the bracket, while avoiding the increase in the number of parts and the number of assembling steps.

SUMMARY OF THE INVENTION

The foregoing subject can be attained in a first feature of the invention by a door mirror for use in a vehicle including

- a base attached to a side door of the vehicle and having a support seat facing upward and a support shaft vertically disposed to the support seat,
- a bearing portion disposed integrally to a bracket for supporting a mirror and supported to the base of the support shaft while enabling the bracket to rotate in the forward and backward directions of the vehicle, and
- a coil spring located under compression between a resilient receptacle secured to the support shaft and the bearing portion for urging the bearing portion toward the support seat, in which
- another bearing portion that is spaced apart from the above mentioned bearing along the axial direction of the support shaft and supported rotationally on the top end of the support shaft is provided integrally to the bracket, and
- the resilient receptacle is secured to a predetermined position of the support shaft so as to sandwich the coil spring that is compressed to a set load after passage of the support shaft through the coil spring located between both of the bearing portions and both of the bearing portions between one of the bearing portions situated on the side of the support seat and the resilient receptacle.

In the first feature of the present invention described above, since a pair of bearing portions provided integrally to the bracket are rotationally supported by the support shaft, the bracket can be supported on the support shaft in the double-side supporting structure thereby capable of suppressing vibrations of the bracket while avoiding increase in the number of parts and the number of assembling steps. In addition, since the resilient receptacle is secured to the predetermined fixing position on the support shaft so as to sandwich the coil spring that is compressed to a set load after passage of the support shaft through the coil spring located between both of the bearing portions and both of the bearing portions between one of the bearing portions situated on the side of the support seat and the resilient receptacle, the coil spring can be mounted to the support shaft while urging the bearing portion on the side of the support seat to the support seat in spite of the structure where a pair of bearing portions are provided integrally to the bracket.

Further, in a second feature of the invention, the bracket is covered by the housing having a window in which the mirror is located and the side wall connecting both of the bearing portions at a portion facing the window is provided integrally to the bracket. According to this feature, since the supporting rigidity by the pair of the bearing portions can be enhanced by the side wall and since the gap between the circumferential edge of the mirror and the housing can be concealed by the side wall such that the coil spring, the resilient receptacles, etc. can not be seen through the gap to improve the commercial appearance.

In a third feature of the invention, the resilient receptacle is a push nut capable of engaging the support shaft 15c and operation holes for the operation of urging the push nut so as to compress the coil spring are formed to one of the bearing portions that situates on the side opposite to the support seat.

The third feature can facilitate the operation of moving the push nut along the support shaft so as to compress the coil spring and engage and secure the push nut to a predetermined position of the support shaft.

In a fourth feature of the invention, a positioning wall is formed to the inner surface of the side wall along a portion of the outer circumference of the coil spring. This feature can define the position of the coil spring upon passage of the support shaft through the coil spring located between both of the bearing portions and facilitate the operation of the passing the support shaft through the coil spring.

DESCRIPTION OF ACCOMPANYING DRAWINGS

The present invention is to be described by way of a preferred embodiment based on an example of the invention shown in the appended drawings; wherein FIG. 1 is a side elevational view of a passenger car;

DESCRIPTION OF PREFERRED EMBODIMENTS

FIG. 1 to FIG. 6 show an embodiment of the present invention.

Figure 1:
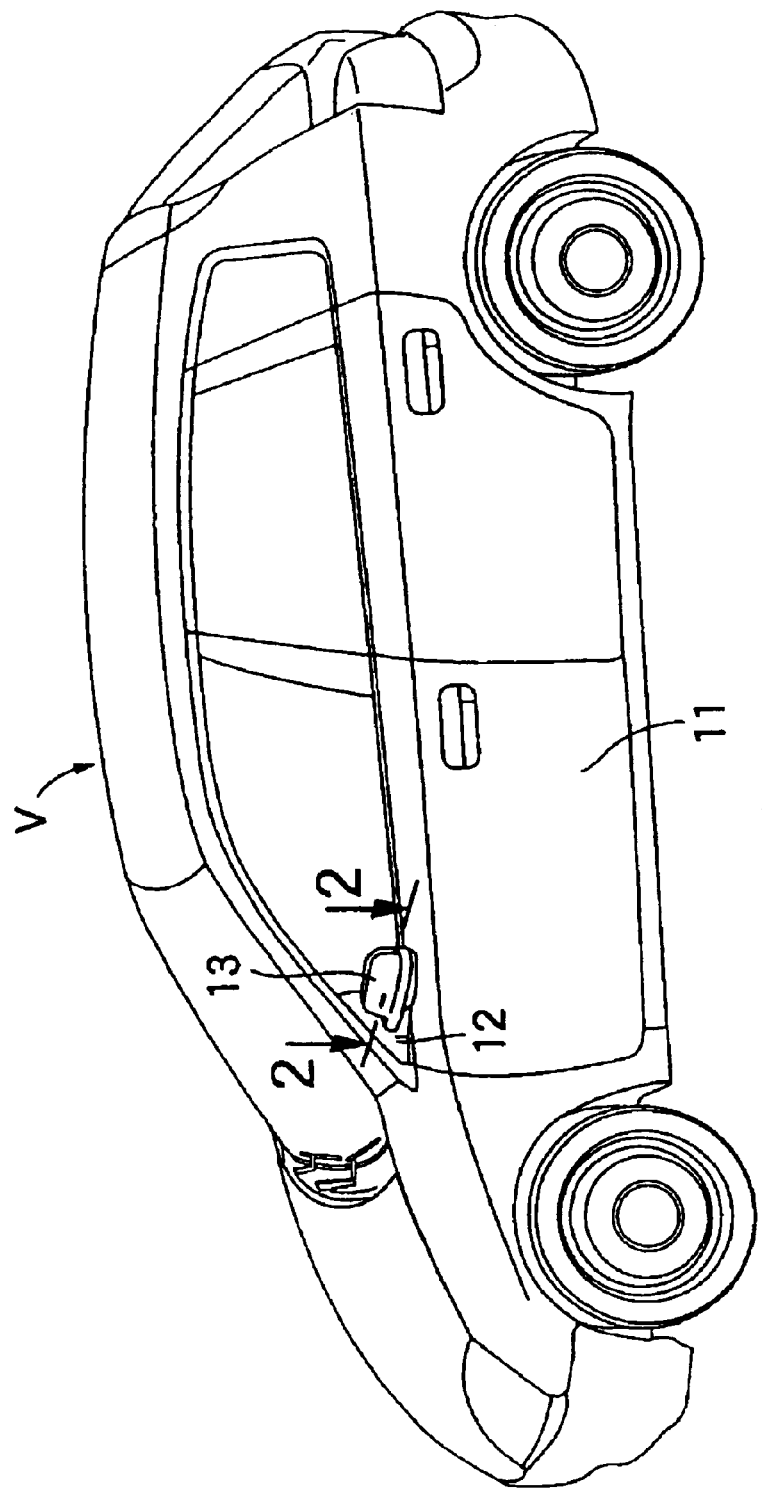
Figure 2:
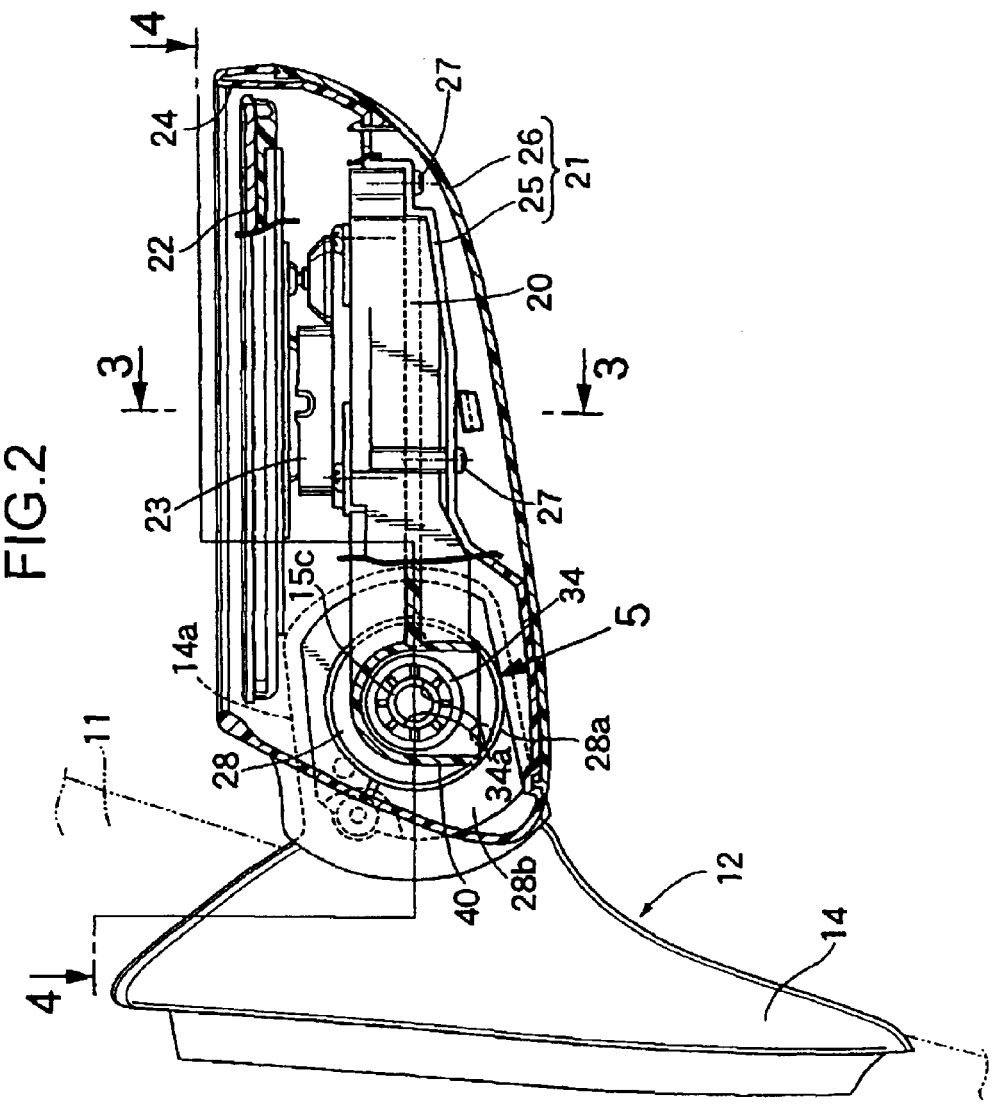
FIG. 2 is an enlarged cross sectional view taken along line 2—2 in FIG. 1.
Figure 3:
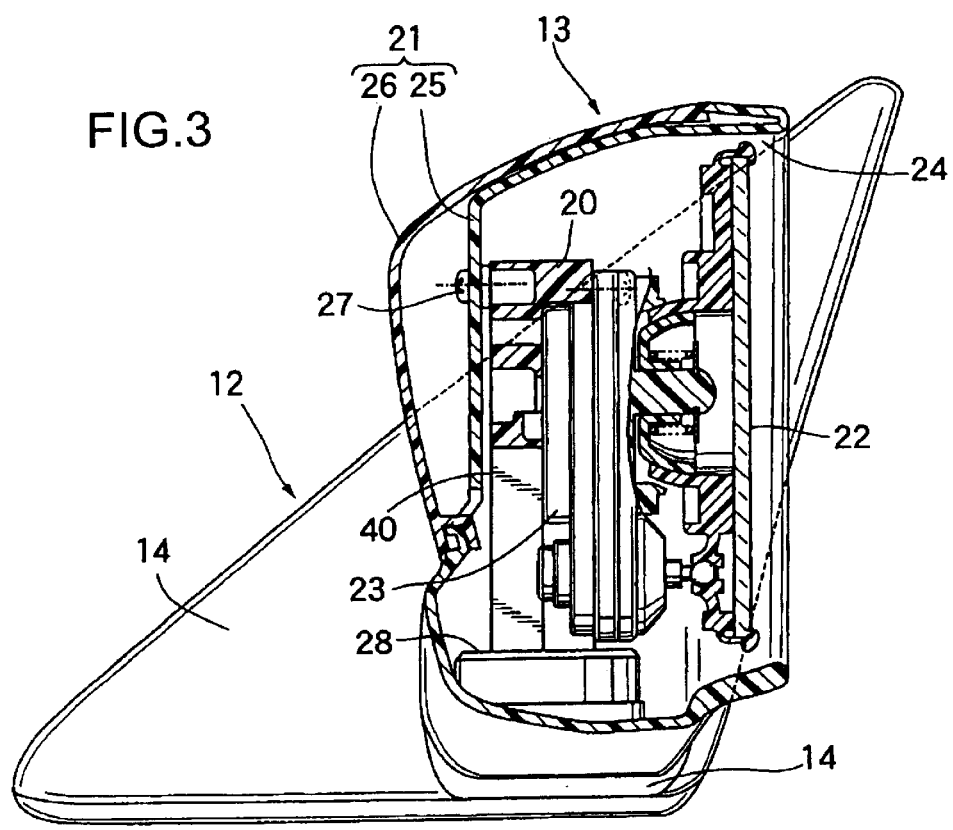
FIG. 3 is a cross sectional view taken along line 3—3 in FIG. 2.

In FIG. 1, a base 12 is attached to a side door 11 of a passenger car V, and a mirror main portion 13 is rotationally supported on the base 12 such that it can rotate forward to backward of the passenger car V.

Referring to FIG. 1 to FIG. 4 together, the base 12 comprises a base member 14 made of a synthetic resin attached to the side door 11 and having a support arm 14a protruded outward of the side door 11, and a metal support member 15 attached to the base member 14.

An opening 16 is formed to an upper portion of the support arm 14a, and the support member 15 comprises a flat plate part 15a disposed to the opening 16 and forming a support seat 17 facing upward, a support cylinder 15b of a substantially closed cylindrical shape raised upward from the support seat 17 and a support shaft 15c of a cylindrical shape having a diameter smaller than that of the support cylinder 15b and raised upward from the central portion at a closed top end of the support cylinder 15b as an integral structure. The flat plat part 15a is secured to the support arm 14a of the base member 14 by a plurality of screws 18, 18, - - - .

A mirror main portion 13 comprises a bracket 20 made of a synthetic resin rotationally supported on a support shaft 15c of the base 12, a housing 21 attached to the bracket 22 while covering the bracket 20, a mirror 22 for viewing backward of the vehicle V, and an electric actuator 23 held to the bracket 20 and adapted to drive the mirror 22 slantwise forward to backward and leftward to rightward. The mirror 22 facing the window 24 of the housing 21 is supported by way of the electromotive actuator 23 to the bracket 20.

The housing 21 comprises a housing main portion 25 made of a synthetic resin and attached to the bracket 20 by means of a plurality of screws 27, 27, - - - , and a cover 26 made of a synthetic resin engaged and connected to the housing main portion 25 on the side opposite to the window 24 so as to cover the housing main portion 25. The window 24 for exposing the mirror 22 is provided to the housing main portion 25.

Figure 5:
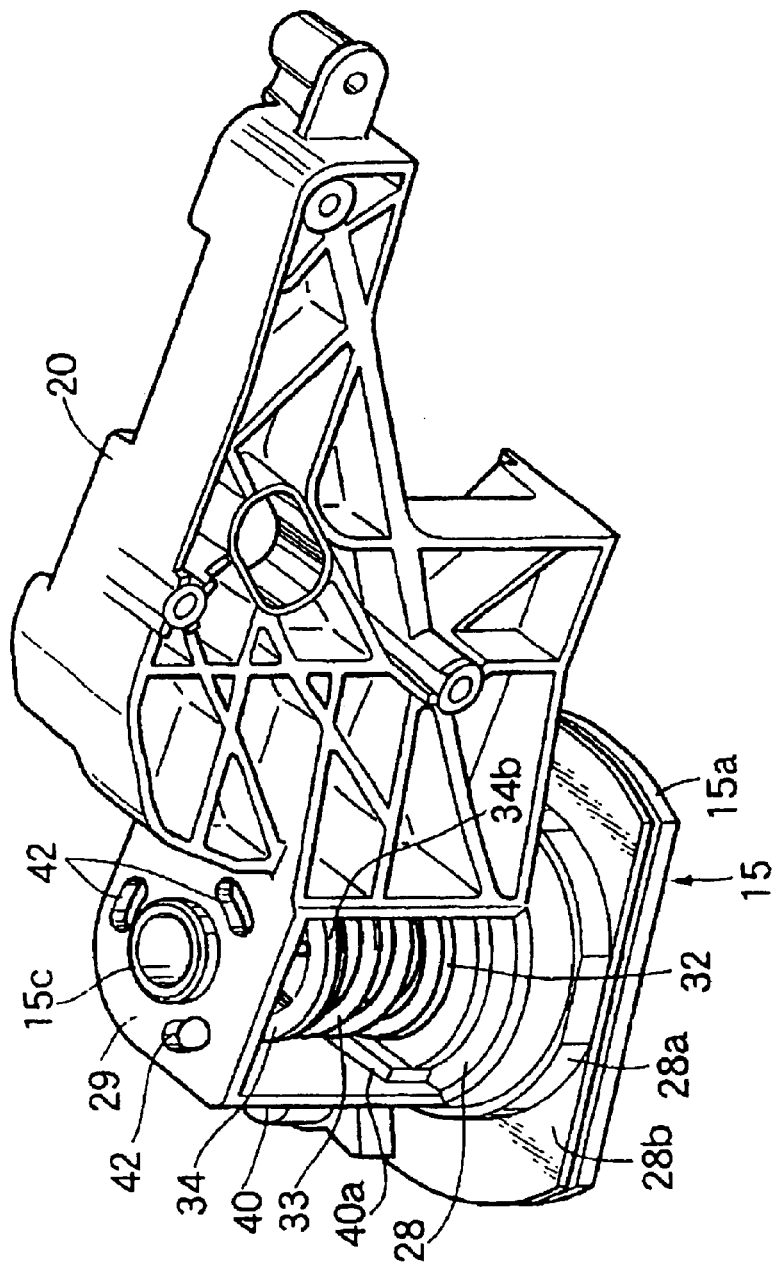
FIG. 5 is a perspective view of a support member and a bracket as viewed in the direction of an arrow in FIG. 2.
Figure 6:
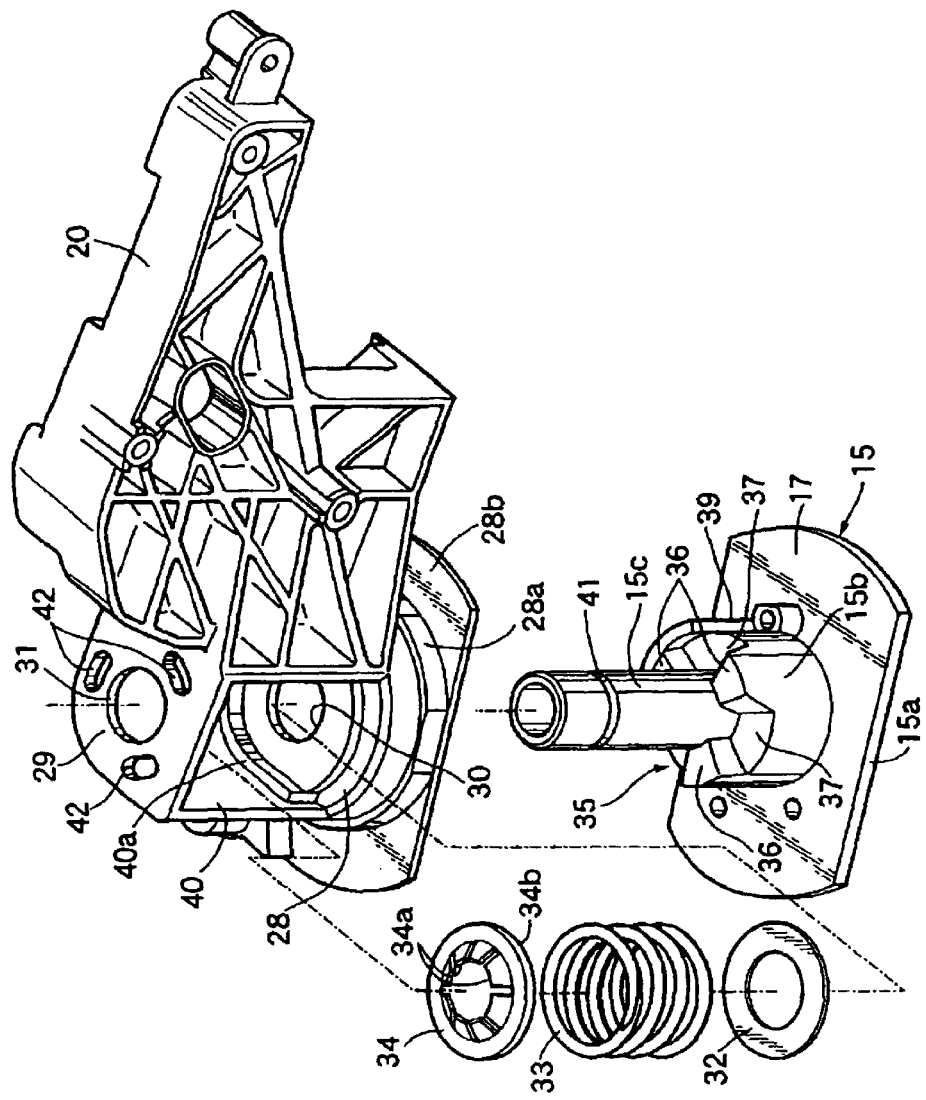
FIG. 6 is an exploded perspective view of a support member and a bracket as viewed in the direction identical with FIG. 2.

Further referring to FIG. 5 and FIG. 6 together, the bracket 20 is integrally provided with a first bearing portion 28 supported rotationally at the base end of the support shaft 15c, and a second bearing portion-29 disposed at a position spaced apart from the first bearing portion 28 along the axial direction of the support shaft 15c and supported rotationally at the top end of the support shaft 15c. Further, the first bearing portion 28 integrally has a cylindrical member 28a that fits the support cylinder 15b of the base member 12 and an opposing plate 18b that is in contiguous with the cylinder portion 28a and faces the support seat 17 of the base member 12.

The first bearing portion 28 defines a first support hole 30 for allowing the base end of the support shaft 15c to pass therethrough, while the second bearing portion 29 defines a second support aperture 31 for allowing the top end of the support shaft 15c to pass therethrough. The bracket 20 is rotationally supported to the support shaft 15c by the first and second bearing portions 28 and 29 located at positions spaced apart from each other along the axial line of the support shaft 15c.

A washer 32 abuts against the upper surface of the first bearing portion 28. A compression coil spring 33 surrounding the support shaft 15c is located between the washer 32 and a push nut 34 as a resilient receptacle secured at a predetermined position of the support shaft 15c between the first and second bearing portions 28 and 29. The first bearing portion 28 is urged to the support seat 17 of the base member 12 by a spring force developed by the coil spring 33.

A click mechanism 35 is present between opposing surfaces of the first bearing portion 28 and the support cylinder 15b for giving clear feeling of clicking motion when the bracket 20, that is, the mirror main portion 13 rotates between each of an upright position protruding sideways from the side door 11, a forward housed position where it rotates from the upright position and approaches the side door 11 in the forward direction of the vehicle V and a backward housed position where it rotates from the upright position and approaches the side door 11 of the vehicle V.

Figure 4:
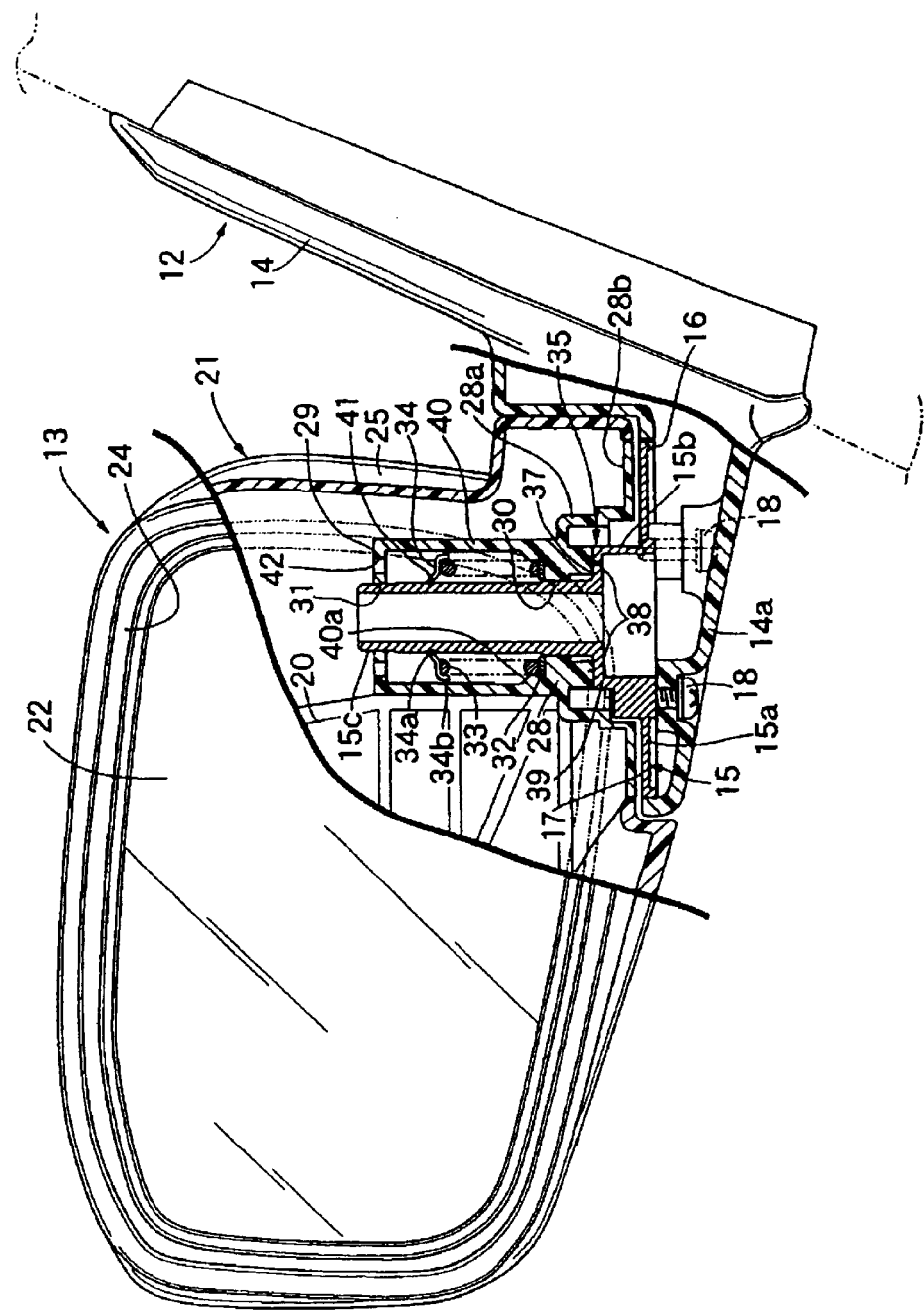
FIG. 4 is a cross sectional view taken along line 4—4 in FIG. 2.

The click mechanism 35 comprises three protrusions 36, 36 and 36 each of a trapezoidal cross sectional shape which are located to the closed top end of the support cylinder 15b with a space to each other around the support shaft 15c and so as to define recesses 37 and 37 between each other, and three fitting protrusions 38, 38, 38 are located to the first bearing portion 28 at a space to each other around the first support hole 30 and disposed integrally, each with a shape capable of fitting to each of the recessed portions 37, 37, and 37, (refer to FIG. 4). An arcuate stopper 39 that extends outward of the outer surface of the support cylinder 15b is formed integrally with the outer circumferential surface of the support cylinder 15b within a predetermined circumferential range. An abutment (not illustrated) that engages the stopper 39 is formed to the inner circumference of the cylinder 28a in contiguous with the first bearing 28 for controlling the rotational range of the bracket 20, that is, the mirror main portion 13 relative to the support shaft 15c.

In the click mechanism 35 described above, the mirror main portion 13 situated at the upright position, the forward housed position or the backward housed position in a state where each of the fitting protrusions 38, 0.38, and 38 is fitted to each of the recesses 37, 37, and 37. Further, since the mirror main portion 13 can rotate from the upright position to the forward housed position or the backward housed position when each of the fitting protrusions 38, 38, and 38 overrides each of the protruding portions 36, 36, 36 against the spring force of the coil spring 33, a clear feeling of clicking motion can be given upon rotation of the mirror main portion 13 between the upright position and the forward housed portion, as well as between the upright position and the backward housed position.

The bracket 20 has a side wall 40 formed integrally therewith that connects the first and second bearing portions 28 and 29 at a position facing the wall 24 of the housing 21. The side wall 4 has a substantially U-shaped cross sectional shape and is located facing the wall 24. Further, a positioning wall 40a is formed to the inner surface of the side wall 40 along a portion of the outer circumference at one end of the coil spring 33 near the first bearing portion 28.

For reliably securing the push nut 34 to the support shaft 15c, a circular engaging groove 41 is formed around the outer circumference at a predetermined position of the support 15c between the first and the second bearing portions 28 and 29. Further, the push nut 34 has a plurality of engaging fingers 34a, 34a, - - - resiliently engaging the circular engaging groove 41 and also has eaves 34b covering the outer circumference at the other end of the coil spring 33 over the entire outer circumference of the push nut 34.

In this embodiment, a support shaft 15c is passed through the first and second bearings 28 and 29, the washer 32, the coil spring 33 and the push nut 34 in a state where the washer 32, the coil spring 33 and the push nut 34 are positioned in this order from the side of the first bearing 28 between the first bearing portion 28 and the second bearing portion 29. Then, the push nut 34 can be moved along the support shaft 15c till a position corresponding to the circular engaging groove 41 so as to compress the coil spring 33 to a predetermined set load. Then, the push nut 34 is secured to a predetermined position of the support shaft 15c by engaging each of engaging fingers 34a, - - - to the circular engaging groove 41 with the coil spring 33 compressed to a set load being sandwiched between it and the washer 32 abutting against the first bearing 28.

Operation holes 42, 42, - - - are formed to the second bearing portion 29, for example, by the number of three around the periphery of the second support hole 31 for allowing fingers of a pressing jig to pass therethrough in an operation of passing the push nut 34 so as to compress the coil spring 33.

Then, the function of the illustrated embodiment is to be described.

The bracket 20 is integrally provided with the first bearing portion 28 supported rotationally at the base end of the support shaft 15c and the second bearing portion 29 disposed at a position spaced apart from the first bearing portion 28 along the axial direction of the support shaft 15c and supported rotationally on the top end of the support shaft 15c. The bracket 20 can be supported by a double-side supporting structure on the support shaft 15c such that a pair of bearing portions 28 and 29 are rotationally supported on the support shaft 15c and can suppress the vibrations of the bracket 20. Further, compared with the existent double-side supporting structure of attaching the support member 15 to the bracket 20, since both of the bearing portions 28 and 29 are integrally formed to the bracket 20, increase in the number of parts and the number of assembling steps can be avoided.

In addition, the push nut 34 is secured to a predetermined position on the support shaft 15c with the coil spring 33 being sandwiched between the push nut and the first bearing 28. Since the support shaft 15c is passed through the washer 32, the coil spring 33 and the push nut 34 located between both of the bearings 28 and 29, as well as both of the bearings 28 and 29, and then the push nut 34 is secured to a predetermined position of the support shaft 15c with the coil spring 33 compressed to the set load being put between the push nut and the first bearing 28, the coil spring 33 can be mounted to the support shaft 15c while urging the first bearing 28 to the support seat 17 in spite of the integral structure of providing the pair of the bearing portions 28 and 29 to the bracket 20.

By the way, in a case of conducting the operation of inserting the shaft 15c, when the length of the coil spring 33 in a non-loaded state is predetermined such that the push nut 34 is sandwiched under slight compression between the other end of the coil spring 33 which fits at one end to the washer 32 which is abutted against the first bearing portion 28, and the second bearing portions 29, it is no more necessary for an operator to hold the washer 32, the coil spring 33 and the push nut 33 placed between both of the bearing portions 28 and 29 to facilitate the operation of inserting the support shaft 15c.

In addition, since the eaves 34b covering the outer circumference of the other end of the coil spring 33 are formed for the entire outer circumference of the push nut 34, the coil spring 33 and the push nut 34 can be easily kept coaxially, which can also facilitate the operation of inserting the support shaft 15c.

Further, since the bracket 20 is integrally provided with the side wall 40 that connects the first and second bearing portions 28 and 29, the side wall 40 can enhance the supporting rigidity for the first and second bearing portions 28 and 29. In addition, since the bracket 20 is covered with the housing 21 having the window 24 in which the mirror 22 is located, and the side wall 40 of the substantially U-shaped configuration is located to a portion facing the window 24, the side wall 40 can enclose the coil spring 33, the push nut 34 and the like such that they can not be seen through the gap between the circumferential edge of the mirror 22 and the housing 21 to enhance the commercial appearance of products.

Further, since the positioning wall 40a is formed to the inner surface of the side wall 40 along a portion of the outer circumference of the coil spring 33 and the positioning wall 40a is formed to the inner surface of the side wall 40 near the first bearing portion 28 so as to be along a portion of the outer circumference at one end of the coil spring 33 in this embodiment, the position for the coil spring 33 can be determined automatically when the support shaft 15c is inserted into the coil spring 33 located between both of the bearing portions 28 and 29 to facilitate the operation of inserting the support shaft 15c.

Further, since the operation holes 42, 42, - - - , for example, by the number of three are disposed to the second bearing portion 29 for conducting the operation of pressing the push nut 34 capable of engaging the circular engaging groove 41 formed on the support shaft 15c so as to compress the coil spring 33, this can facilitate the operation of moving the push nut 34 along the support shaft 15c so as to compress the coil spring 33 thereby engaging and securing the push nut to the predetermined position of the support shaft 15c.

The present invention has been described with reference to the preferred embodiment but it will be apparent that the invention is not restricted to the illustrated embodiment described above but can be modified variously without departing the gist of the invention described in the scope of the claim for patent.

For example, while the push nut 34 is used as the resilient receptacle in the embodiment described above, it may be replaced with a retainer ring.

As has been described above, in the first aspect feature of the invention, since a pair of bearing portions provided integrally to the bracket are supported rotationally to the support shaft, the bracket can be supported on the support shaft by the double-side supporting structure to suppress vibrations of the bracket, while avoiding increase in the number of parts and the number of assembling steps. In addition, the coil spring can be mounted to the support shaft while urging the bearing portion on the side of the support seat against the supporting seat in spite of the structure where the pair of the bearing portions are provided integrally to the bracket.

Further, in the second feature of the invention, the supporting rigidity by the pair of the bearing portions can be enhanced by the side wall, and the coil springs and the resilient receptacle can be concealed by the side wall so that they can not be seen through the gap between the circumferential edge of the mirror and the housing to improve the commercial appearance of products.

In the third feature of the invention, it is possible to facilitate the operation of moving the push nut along the support shaft so as to compress the coil spring thereby engaging and securing the push nut at a predetermined position on the support shaft.

Further, in the fourth feature of the invention, the position of the coil spring can be determined automatically upon insertion of the support shaft through the coil spring disposed between both of the bearing portions to facilitate the operation of inserting the support shaft.

What is claimed is:

1. A door mirror for use in a vehicle including:
a base attached to a side door of the vehicle and having a support seat facing upward and a support shaft (15c) vertically disposed to the support seat,
a bearing portion disposed integrally to a bracket for supporting a mirror and supported by way of a click mechanism to the support shaft while enabling the bracket to rotate in the forward and backward directions of the vehicle, in which
the bearing portion comprises a first bearing portion and a second bearing portion formed integrally to the bracket being spaced apart from each other along the axial direction of the support shaft,
a coil spring located under compression around the support shaft between the first bearing portion and the second bearing portion for urging the bracket downward toward the support seat, and
a resilient receptacle movable along the axial direction of the support shaft and placed in contact with the upper end of the coil spring so as to urge the coil spring downward toward the support seat, in which
the resilient receptacle is secured to a predetermined axial position of the support shaft when it urges the coil spring to a state compressed to a set load after insertion of the support shaft between both of the bearing portions.

2. A door mirror as defined in claim 1 wherein the bracket is covered with a housing having a window in which the mirror is located, and a side wall connecting both of the bearing portions at a portion facing the window is provided integrally with the bracket.

3. A door mirror as defined in claim 1 wherein the resilient receptacle is a push nut capable of engaging the support shaft, and operation holes for the operation of urging the push nut so as to compress the coil spring are formed to one of the bearing portions that situates on the side opposite to the support seat.

4. A door mirror as defined in claim 2, wherein a positioning wall is formed to the inner surface of the side wall along a portion of the outer circumference of the coil spring.

5. A door mirror as defined in claim 2, wherein the resilient receptacle is a push nut capable of engaging the support shaft, and operation holes for the operation of urging the push nut so as to compress the coil spring are formed to one of the bearing portions that situates on the side opposite to the support seat.

6. A door mirror according to claim 1, wherein the support shaft has an engaging groove around the outer circumference at the predetermined axial position between the first bearing portion and the second bearing portion for engaging the resilient receptacle when it urges the upper end of the coil spring when it is compressed to the predetermined set load.

* * * * *